(12) United States Patent
Murayama (10) Patent No.: US 8,380,897 B2
(45) Date of Patent: *Feb. 19, 2013

(54) HOST COMPUTER, COMPUTER TERMINAL, AND CARD ACCESS METHOD

(75) Inventor: Masayoshi Murayama, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,661

(22) Filed: Jun. 1, 2012

(65) Prior Publication Data

US 2012/0246357 A1   Sep. 27, 2012

Related U.S. Application Data

(62) Division of application No. 12/823,632, filed on Jun. 25, 2010, now Pat. No. 8,214,563.

(30) Foreign Application Priority Data

Jun. 30, 2009   (JP) .................................. 2009-156010

(51) Int. Cl.
*G06F 3/00* (2006.01)

(52) U.S. Cl. .............. 710/60; 710/58; 710/71; 710/301; 710/316; 365/189.05; 365/194; 365/233.12; 365/233.13; 711/100; 711/115; 711/167; 713/500; 713/501; 713/503; 713/600

(58) Field of Classification Search ........................ None
See application file for complete search history.

(56) References Cited

U.S. PATENT DOCUMENTS

| | | | |
|---|---|---|---|
| 6,119,195 A * | 9/2000 | Ellis et al. ...................... | 710/310 |
| 6,256,687 B1 * | 7/2001 | Ellis et al. ....................... | 710/71 |
| 6,460,125 B2 | 10/2002 | Lee et al. ....................... | 711/167 |
| 6,633,956 B1 | 10/2003 | Mitani .......................... | 711/115 |
| 6,975,152 B1 | 12/2005 | Lapidus ........................ | 327/202 |
| 6,990,599 B2 | 1/2006 | Takamiya et al. ............. | 713/600 |
| 7,269,709 B2 | 9/2007 | Kelly ............................ | 711/211 |
| 7,395,398 B2 | 7/2008 | Kim ............................. | 711/167 |

(Continued)

FOREIGN PATENT DOCUMENTS

| | | |
|---|---|---|
| JP | 2001-345881 | 12/2001 |
| JP | 2002-251367 | 9/2002 |

(Continued)

OTHER PUBLICATIONS

Japanese Patent Application No. 2009-156010; Notice of Reasons for Rejection; Mailed Feb. 8, 2011 (English translation).

(Continued)

*Primary Examiner* — Steven Snyder
(74) *Attorney, Agent, or Firm* — Blakely, Sokoloff, Taylor & Zafman LLP (57) ABSTRACT

According to one embodiment, the host controller includes a transmission circuit that encodes transmission data, according to a serial transfer format, a reception circuit that decodes received data, according to the serial transfer format, a variable frequency clock generator that generates a card clock and a transfer clock, a card clock output unit that outputs the card clock to the memory card, an interface unit that includes both a transmission interface that transfers the transmission data from the transmission circuit to the memory card in synchronization with the transfer clock and a reception interface that transfers received data from the memory card to the reception circuit in synchronization with the transfer clock, and a setting register circuit that holds setting information for an input/output method of the memory card, and controls frequency of the transfer clock generated by the variable frequency clock generator, based on the setting information.

20 Claims, 5 Drawing Sheets

U.S. PATENT DOCUMENTS

| | | | |
|---|---|---|---|
| 7,490,258 B2 | 2/2009 | Sakamoto et al. | 713/600 |
| 7,827,424 B2 | 11/2010 | Bounitch | 713/322 |
| 7,966,512 B2 | 6/2011 | Sakamoto et al. | 713/600 |
| 8,166,221 B2 * | 4/2012 | Lee et al. | 710/74 |
| 2002/0064072 A1 | 5/2002 | Ooishi et al. | 365/185.29 |
| 2003/0046599 A1 | 3/2003 | Takamiya et al. | 713/600 |
| 2003/0103407 A1 | 6/2003 | Ooishi et al. | 365/233.12 |
| 2004/0153683 A1 * | 8/2004 | Chiang | 713/500 |
| 2004/0243877 A1 | 12/2004 | Sakamoto et al. | 713/600 |
| 2005/0034008 A1 * | 2/2005 | Xiao et al. | 713/500 |
| 2005/0193162 A1 | 9/2005 | Chou et al. | 711/103 |
| 2005/0235110 A1 | 10/2005 | Mylly | 711/115 |
| 2006/0043202 A1 | 3/2006 | Kim et al. | 235/492 |
| 2006/0052962 A1 * | 3/2006 | Shipton et al. | 702/106 |
| 2008/0189555 A1 | 8/2008 | Sohn | 713/192 |
| 2009/0016128 A1 | 1/2009 | Hirano | 365/194 |
| 2009/0200368 A1 | 8/2009 | Kim et al. | 235/375 |
| 2010/0169699 A1 | 7/2010 | Fujimoto | 713/503 |

FOREIGN PATENT DOCUMENTS

| | | |
|---|---|---|
| JP | 2006-065867 | 3/2006 |
| JP | 2007-034540 | 2/2007 |
| JP | 2008-14554 | 1/2008 |
| JP | 2008-129616 | 6/2008 |
| JP | 2008-176765 | 7/2008 |

OTHER PUBLICATIONS

Japanese Patent Application No. 2009-156010; Notice of Reasons for Rejection; Mailed Nov. 2, 2010 (English translation).

'Via Apollo KT 266—how to warm up the people' article from iXBT labs, Apr. 11, 2001.

'Multi-Port AHB SDR/DDR SDRAM Memory Controller BA312' FactSheet, from arco-Silex, Oct. 13, 2008.

U.S. Appl. No. 12/823,632; Notice of Allowance; Mailed Feb. 16, 2012.

* cited by examiner

HOST COMPUTER, COMPUTER TERMINAL, AND CARD ACCESS METHOD

CROSS-REFERENCE TO RELATED APPLICATIONS

This application is a Divisional application of U.S. application Ser. No. 12/823,632 filed Jun. 25, 2010, now U.S. Pat. No. 8,214,563, which claims the benefit of priority from Japanese Patent Application No. 2009-156010, filed Jun. 30, 2009; the entire contents of which are incorporated herein by reference.

FIELD

Embodiments described herein relate generally to a host computer and a computer terminal for accessing a memory card such as an SD card or a multimedia card and a card access method.

BACKGROUND

In recent years, computer terminals such as notebook computers and personal digital assistant (PDA) terminals have become remarkably popular. Many of these computer terminals are equipped with a host controller as an interface circuit which enables optional use of memory cards. Common memory cards employ an input/output method based on a single data rate (SDR), in which data transfer frequency is set to the same clock frequency (×1) as data read/write frequency for an internal memory cell array. Also recently, there have appeared double-data-rate (DDR) memory cards in which magnification of transfer clock frequency is twice the aforementioned data read/write frequency, and double data rate 2 (DDR2) memory cards in which the magnification is four times the data read/write frequency.

Meanwhile, conventional host controllers are designed to be compatible with memory cards according to the SDR method, and are therefore incompatible with memory cards according to the DDR method. Although host controllers compatible with the DDR method have been proposed, such host controllers are incompatible with the SDR method in contrast. These circumstances give rise to enhancement of installation space and power consumption when hardware equipments for the SDR method and for the DDR method are built in one device together.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, there is provided a host controller comprising: a card slot 9 into which a memory card is inserted; a transmission circuit 40 which encodes transmission data, according to a serial transfer format; a reception circuit 50 which decodes received data, according to the serial transfer format; a variable frequency clock generator 10 which generates a card clock and a transfer clock; a card clock output unit 20 which outputs the card clock to the memory card; an interface unit 60 comprising a transmission interface 61 which transfers the transmission data from the transmission circuit 40 to the memory card in synchronization with the transfer clock, and a reception interface 62 which transfers received data from the memory card to the reception circuit 50 in synchronization with the transfer clock; and a setting register circuit 30 which holds setting information concerning an input/output method of the memory card, and controls frequency of the transfer clock generated by the variable frequency clock generator 10, based on the setting information.

According to a second aspect of the invention, there is provided a card access method using a host controller comprising: a card slot into which a memory card is inserted; a transmission circuit which encodes transmission data, according to a serial transfer format; a reception circuit which decodes received data, according to the serial transfer format; a variable frequency clock generator which generates a card clock and a transfer clock; a card clock output unit which outputs the card clock to the memory card; and an interface unit comprising a transmission interface which transfers the transmission data from the transmission circuit to the memory card in synchronization with the transfer clock, and a reception interface which transfers received data from the memory card to the reception circuit in synchronization with the transfer clock, wherein setting information concerning an input/output method of the memory card is held in a setting register circuit, and frequency of the transfer clock generated by the variable frequency clock generator is controlled based on the setting information.

According to the foregoing host controller and card access method, the setting information concerning the input/output method of the memory card is held in the setting register circuit. At least the transfer clock generated by the variable frequency clock generator is controlled based on the setting information. In this case, compatibility is available with various data rates which differ depending on input/output methods of memory cards. In addition, most of hardware resources are usable in common without causing troubles from differences among input/output methods. Accordingly, enhancement of installation space and power consumption can be suppressed.

Hereinafter, a computer terminal according to an embodiment of the invention will be described with reference to the accompanying drawings. The computer terminal is a personal digital assistant (PDA) terminal which allows optional use of memory cards.

Figure 1:
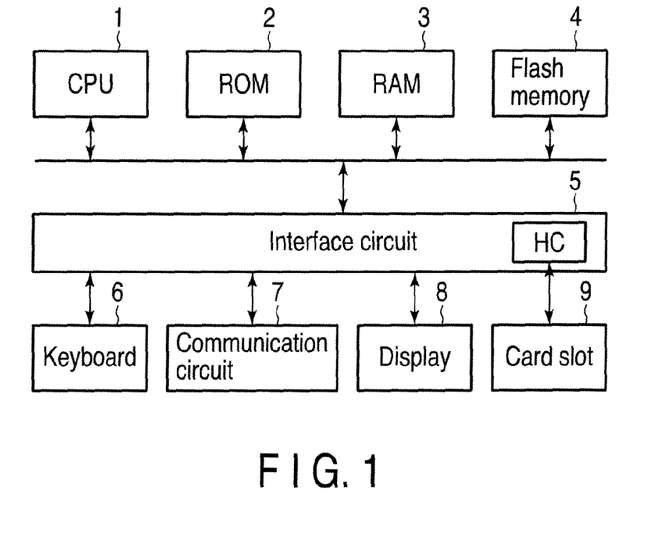
FIG. 1 is a block diagram schematically representing an example configuration of a computer terminal according to an embodiment of the invention.

FIG. 1 schematically represents an example configuration of the computer terminal. The computer terminal comprises: a CPU 1 which controls the entire terminal; a ROM 2 which holds control programs and setting data for the CPU 1; a RAM 3 which temporarily retains input data to the CPU 1 and output data from the CPU 1; a mass flash memory 4 which stores software such as application programs to be executed by the CPU 1; and an interface circuit 5 for external input/output. The CPU 1, ROM 2, RAM 3, flash memory 4, and interface circuit 5 are mutually connected through a system bus. The interface circuit 5 is connected to, for example, a keyboard 6 for allowing various key input operations, a communication circuit 7 further connected wirelessly to the Internet of the like, a display 8 for displaying image information obtained as a processing result of the CPU 1, and a card slot 9 attached optionally with a memory card such as a SD card or a multimedia card. The interface circuit 5 is provided with a host controller HC to access the aforementioned memory card. The host controller HC is compatible with a 4-bit SDR method, an 8-bit SDR method, and a 4-bit DDR method, as typical input/output methods for memory cards. In this embodiment, when a memory card according to any of these three methods is connected to the card slot 9, data writing into and data reading from the memory card are then enabled.

Figure 2:
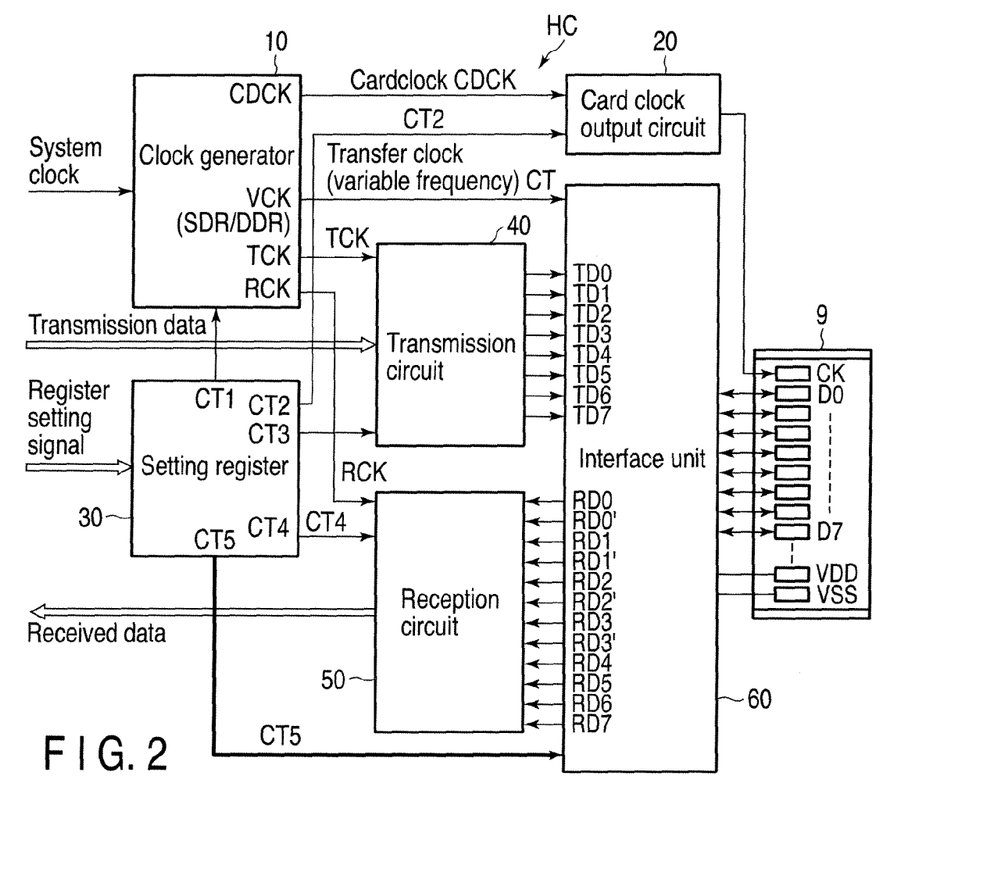
FIG. 2 is a block diagram schematically representing an example configuration of a host controller represented in FIG. 1.

FIG. 2 schematically represents an example configuration of the host controller HC. The host controller HC comprises: a variable frequency clock generator 10; a card clock output circuit 20; a setting register circuit 30; a transmission circuit 40; a reception circuit 50; and an interface unit 60. The setting register circuit 30 includes a group of setting registers for holding setting information concerning an input/output method of a memory card, while the setting information is set by a data processing circuit (unillustrated). The setting register circuit 30 operates in accordance with the setting information, and controls the variable frequency clock generator 10, card clock output circuit 20, transmission circuit 40, receiving circuit 50, and interface unit 60 respectively by using control signals CT1 to CT5 based on the setting information.

The variable frequency clock generator 10 operates, referring to a system clock supplied from the data processing circuit, and generates a card clock CDCK which is output to the card clock output circuit 20, a transfer clock VCK having variable frequency which is output to the interface unit 60, and a reception clock RCK which is output to the reception circuit 50. In control of the clock generator 10, control signal CT1 is used to change the magnification of the transfer clock VCK relative to frequency of the card clock CDCK, so as to comply with the input/output method of the memory card. That is, if the input/output method of the memory card is the SDR method, the frequency of the transfer clock VCK is varied (set) to be equal to the frequency of the card clock CDCK. Alternatively, if the input/output method of the memory card is the DDR method, the frequency of the transfer clock VCK is varied to twice the card clock CDCK. The transmission clock TCK and reception clock RCK have the same frequency as the card clock CDCK.

The card clock output circuit 20 outputs the card clock CDCK to the memory card through the clock terminal CK of the card slot 9. The card clock CDCK is controlled to be output or stopped by control signal CT2. Output of the card clock CDCK is temporarily stopped if an overflow of received data from the memory card need to be avoided.

The transmission circuit 40 is controlled by control signal CT3. The transmission circuit 40 is supplied with transmission data in units of byte or in units of plural bytes from the data processing circuit. The transmission circuit 40 encodes the transmission data in accordance with the serial transfer format in synchronization with the transmission clock TCK, and outputs the encoded data to bit input terminals TD0 to TD7 of the interface unit 60.

The interface unit 60 comprises bit input terminals TD0 to TD7 for transmission data, and bit output terminals RD0 to RD7 and RD0' to RD7' for received data, and is controlled by control signal CT5. As a result of this control, the interface unit 60 switches a transmission data method which is output from bit input terminals TD0 to TD7, so as to comply with the input/output method of the memory card. Respective transmission data bits are serially transferred through corresponding ones of bit input/output terminals D0 to D7 of the card slot 9. From respectively corresponding parts of bit output terminals RD0 to RD7 and RD0' to RD7', the interface unit 60 outputs the received data serially transferred from the memory card through bit input/output terminals D0 to D7 of the card slot 9. The reception circuit 50 is controlled by control signal CT4. In synchronization with the reception clock RCK, the reception circuit 50 decodes received data bits from bit output terminals RD0 to RD7 and RD0' to RD7', and outputs the decoded received data bits as received data in units of byte or in units of plural bytes.

Incidentally, the interface unit 60 supplies the memory card with a power supply voltage through power supply terminals VDD and VSS of the card slot 9. FIG. 2 represents a mere example of an array of terminals for the card slot 9. The array of terminals may be modified into any different order insofar as compatibility is maintained among different types of memory cards.

Figure 3:
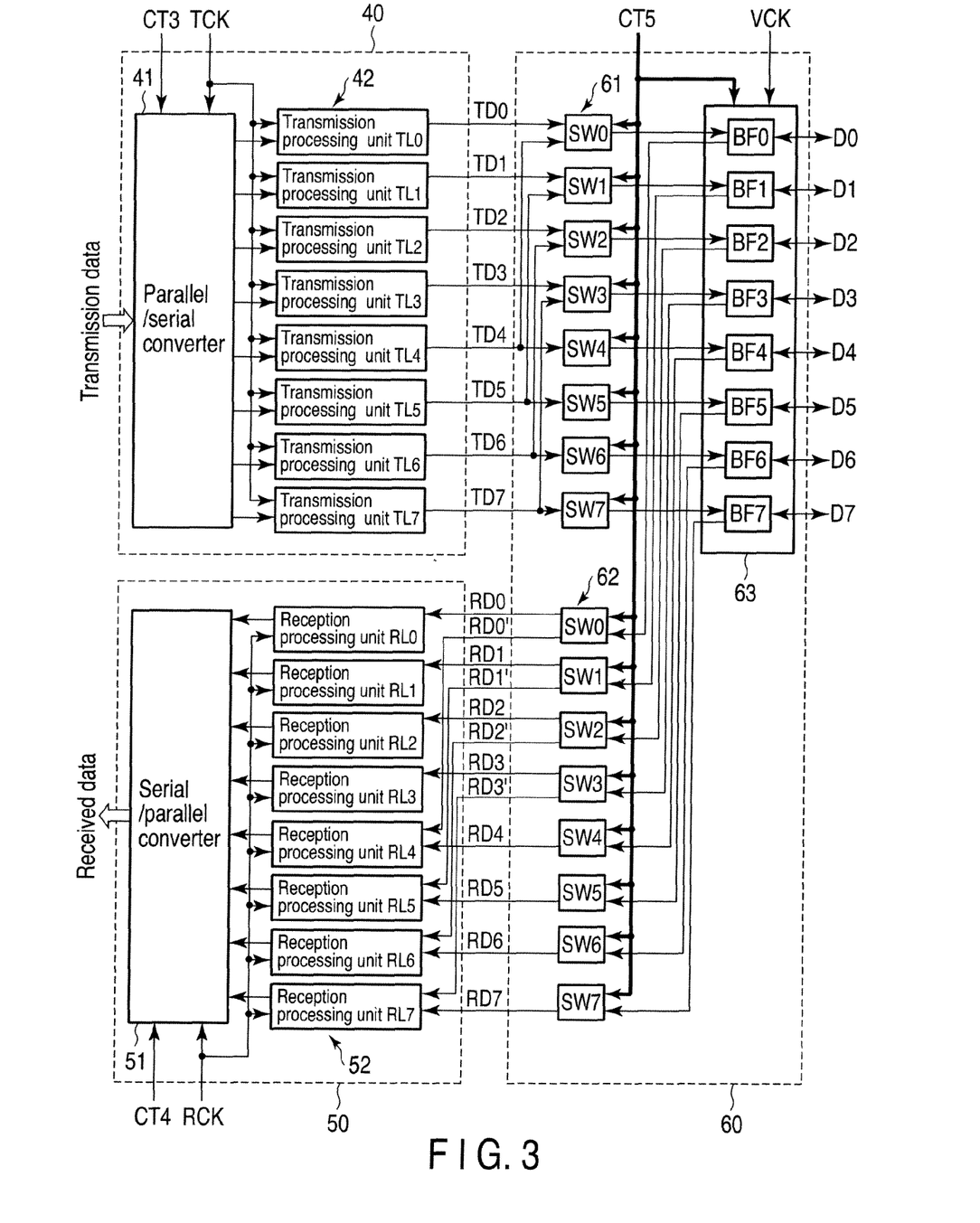
FIG. 3 is a block diagram representing a detailed example configuration of a transmission circuit, a reception circuit, and an interface switching circuit represented in FIG. 2.

FIG. 3 represents a detailed example configuration of the transmission circuit 40, reception circuit 50, and interface unit 60 which are represented in FIG. 2.

The transmission circuit 40 comprises a parallel/serial converter 41 which subjects transmission data to parallel/serial conversion, and eight transmission processing units 42 (TL0 to TL7) which encode, into serial packets, the transmission data sequentially distributed in units of bits by the parallel/serial converter 41. Transmission processing units TL0 to TL7 further add a cyclic redundancy check (CRC) code to the serial packets. Control signal CT3 is supplied to the parallel/serial converter 41, and the transmission clock TCK is supplied to the parallel/serial converter 41 and transmission processing units TL0 to TL7.

The parallel/serial converter 41 is input with parallel transmission data. Each of transmission processing units TL0 to TL7 stores plural identical-bit-position data items of the parallel transmission data. For example, transmission processing unit TL0 stores plural data items at the lowermost bit position (b0) of the parallel transmission data. A predetermined number of identical-bit-position data items stored in each of transmission processing units TL0 to TL7 are coded as serial data and added with a CRC CODE, to be thereby packetized. Accordingly, packetized serial data is output from transmission processing units TL0 to TL7. In this manner, the transmission circuit 40 converts the transmission data input as parallel data into serial data (serial packets) and outputs the serial packets.

The reception circuit 50 comprises eight reception processing units 52 (RL0 to RL7) which decode received data input as serial packets, and a serial/parallel converter 51 which subjects, to serial/parallel conversion, the received data output in units of bits from reception processing units RL0 to RL7. Reception processing units RL0 to RL7 check the cyclic redundancy check (CRC) code, etc. Control signal CT4 is supplied to the serial/parallel converter 51, and the reception clock RCK is supplied to the serial/parallel converter 51 and reception processing units RL0 to RL7.

Each of reception processing units RL0 to RL7 stores packetized serial data. Upon completion of the CRC check, the packetized data is decoded and output as identical-bit-position data items. The serial/parallel converter 51 outputs data input from the reception processing unit 52, as received parallel data (byte data). In this manner, the reception circuit 50 converts serial data into parallel data.

The interface unit 60 comprises a switching circuit 61 for the transmission interface, a switching circuit 62 for the reception interface, and an input/output buffer circuit 63. The input/output buffer circuit 63 comprises eight input/output buffers BF0 to BF7.

The switching circuit 61 comprises eight switches SW0 to SW7. In the switching circuit 61, switches SW0 to SW3 each are a switch with two inputs, and switches SW4 to SW7 each are a switch with one input. Output ends of transmission processing units TL0 to TL7 are respectively connected to first input ends of switches SW0 to SW7 of the switching circuit 61. Output ends of transmission processing units TL4 to TL7 are respectively connected to second input ends of switches SW0 to SW3 of the switching circuit 61. Output ends of switches SW0 to SW7 of the switching circuit 61 are respectively connected to input/output buffers BF0 to BF7. Input/output buffers BF0 to BF7 are respectively connected to bit input/output terminals D0 to D7 of the card slot 9.

The switching circuit 62 also comprises eight switches SW0 to SW7. In the switching circuit 62, switches SW0 to SW3 each are a switch with two inputs, and switches SW4 to SW7 each are a switch with one input. Input ends of reception processing units RL0 to RL7 are respectively connected to first output ends of switches SW0 to SW7 of the switching circuit 62. Input ends of reception processing units RL4 to RL7 are respectively connected to second output ends of switches SW0 to SW3 of the switching circuit 62. Input ends of switches SW0 to SW7 of the switching circuit 62 are respectively connected to input/output buffers BF0 to BF7. Control signal CT5 is supplied to switches SW0 to SW7 of the switching circuit 61, switches SW0 to SW7 of the switching circuit 62, and the input/output buffer circuit 63. The transfer clock VCK is supplied to the input/output buffer circuit 63.

Figure 4:
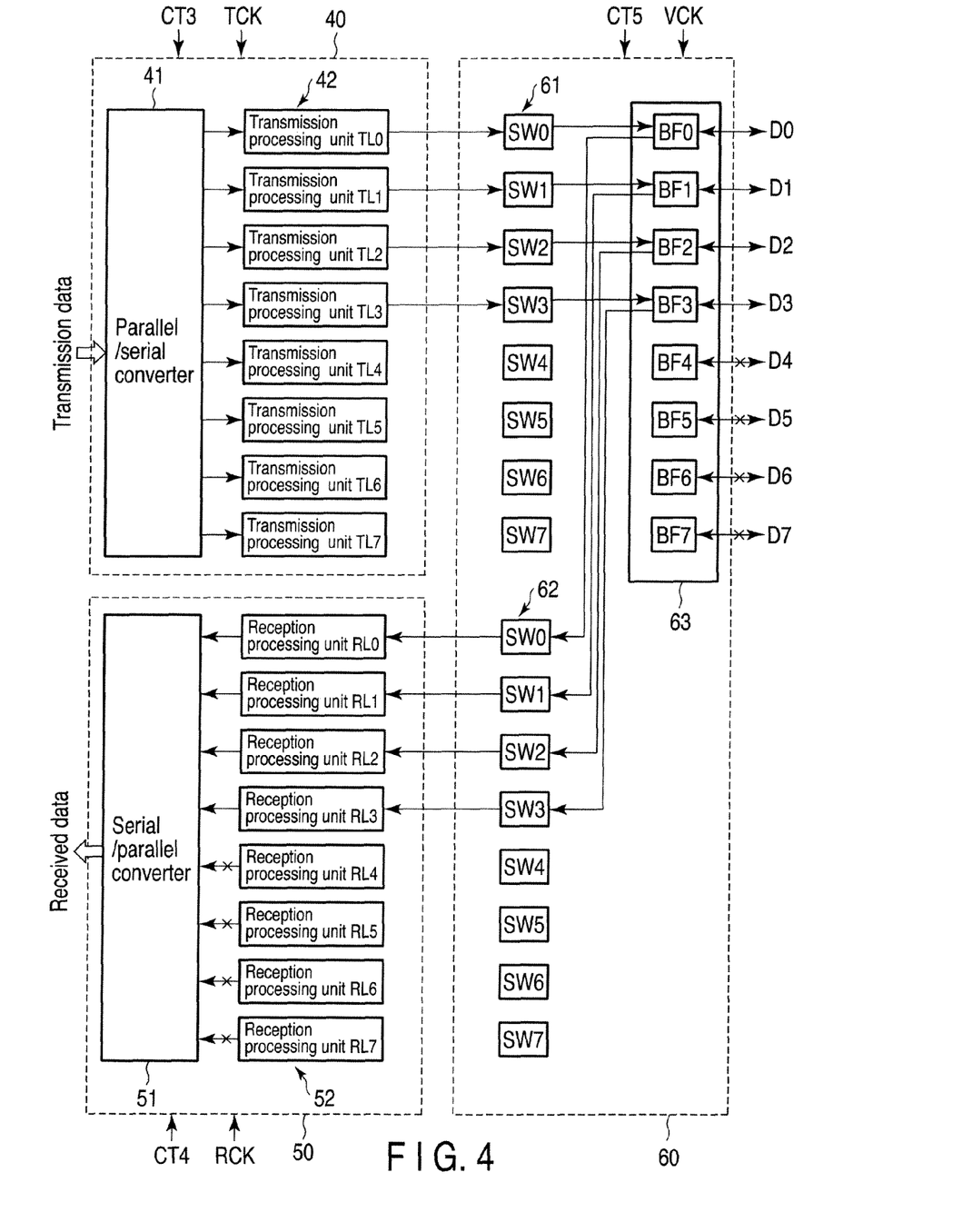
FIG. 4 represents an example of a 4-bit SDR mode interface constructed by switching operation of an interface unit represented in FIG. 3.

FIG. 4 represents an example of a 4-bit SDR mode interface which is constructed by switching operation of the interface unit 60. If setting information registered in the setting register 30 in FIG. 2 expresses the 4-bit SDR mode, the clock generator 10 outputs the card clock CDCK, transfer clock VCK, transmission clock TCK, and reception clock RCK all at equal frequency. In response to control signal CT5, switches SW0 to SW3 in the switching circuit 61 select a group of data lines for four bits, which are connected to transmission processing units TL0 to TL3 of the transmission circuit 40. Transmission data obtained from the group of data lines is supplied to input/output buffers BF0 to BF3, in synchronization with a rise of the transfer clock VCK.

In this manner, input/output buffers BF0 to BF3 serially transfer the transmission data (as serial data) to the memory card through input/output terminals D0 to D3.

On the other side, switches SW0 to SW3 of the switching circuit 62 select a group of data lines for four bits, which are connected to reception processing units RL0 to RL3 of the reception circuit 50. Received data serially transferred from the memory card to input/output buffers BF0 to BF3 through bit input/output terminals D0 to D3 is output to reception processing units RL0 to RL3 in synchronization with a rise of the transfer clock VCK.

Figure 5:
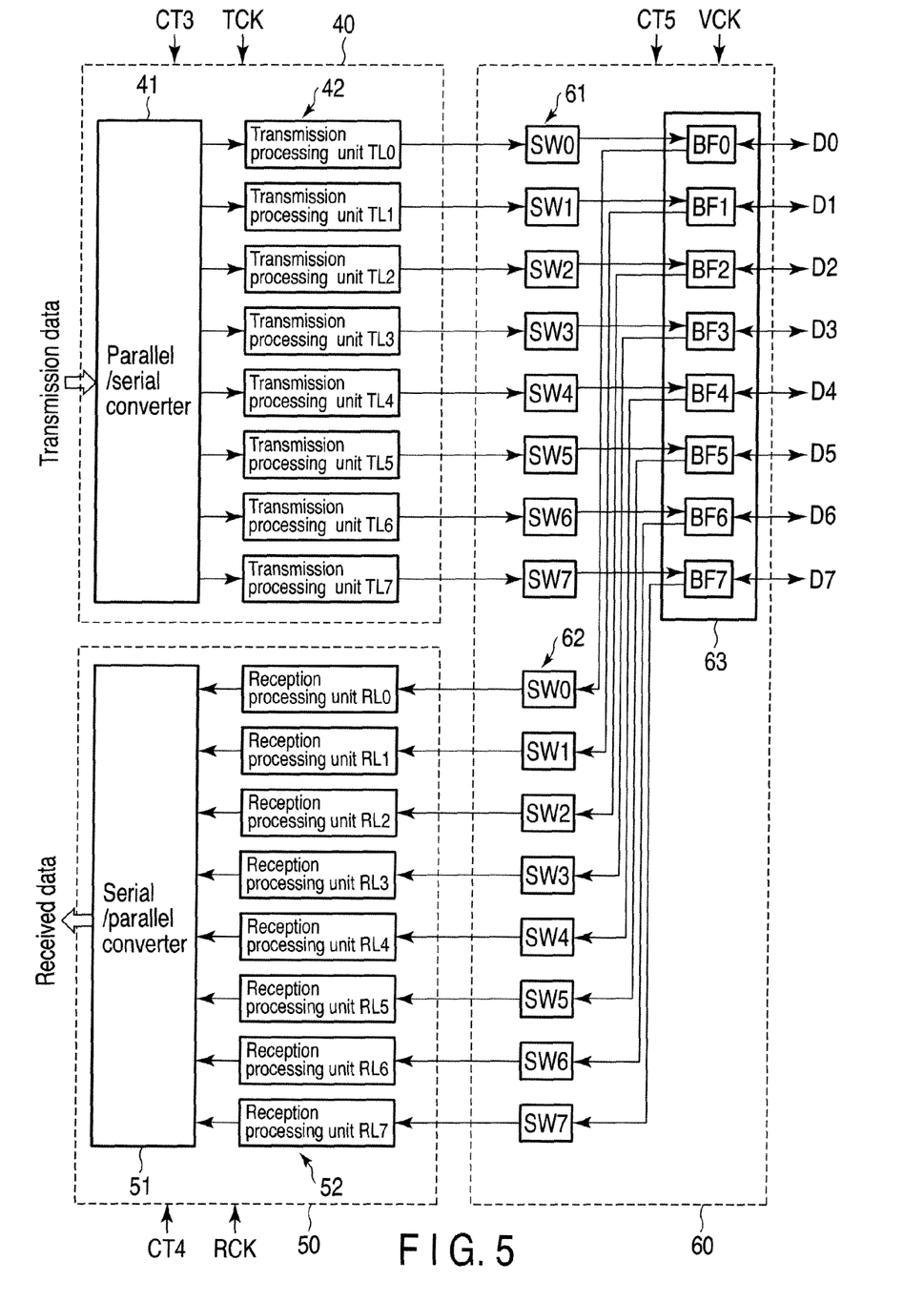
FIG. 5 represents an example of an 8-bit SDR mode interface constructed by switching operation of the interface unit represented in FIG. 3.

FIG. 5 represents an example of an 8-bit SDR mode interface which is constructed by switching operation of the interface unit. If setting information registered in the setting register 30 in FIG. 2 expresses the 8-bit SDR mode, the clock generator 10 outputs the card clock CDCK, transfer clock VCK, transmission clock TCK, and reception clock RCK all at equal frequency as well.

In response to control signal CT5, switches SW0 to SW7 of the switching circuit 61 select a group of data lines for eight bits, which are connected to transmission processing units TL0 to TL7 of the transmission circuit 40. Transmission data obtained from the group of data lines is supplied to input/output buffers BF0 to BF7, in synchronization with a rise of the transfer clock VCK. In this manner, input/output buffers BF0 to BF7 serially transfer the transmission data to the memory card through input/output terminals D0 to D7.

On the other side, switches SW0 to SW7 of the switching circuit 62 select a group of data lines for eight bits, which are connected to reception processing units RL0 to RL7 of the reception circuit 50. Received data transferred from the memory card to input/output buffers BF0 to BF7 through bit input/output terminals D0 to D7 is output to reception processing units RL0 to RL7 in synchronization with a rise of the transfer clock VCK.

Figure 6:
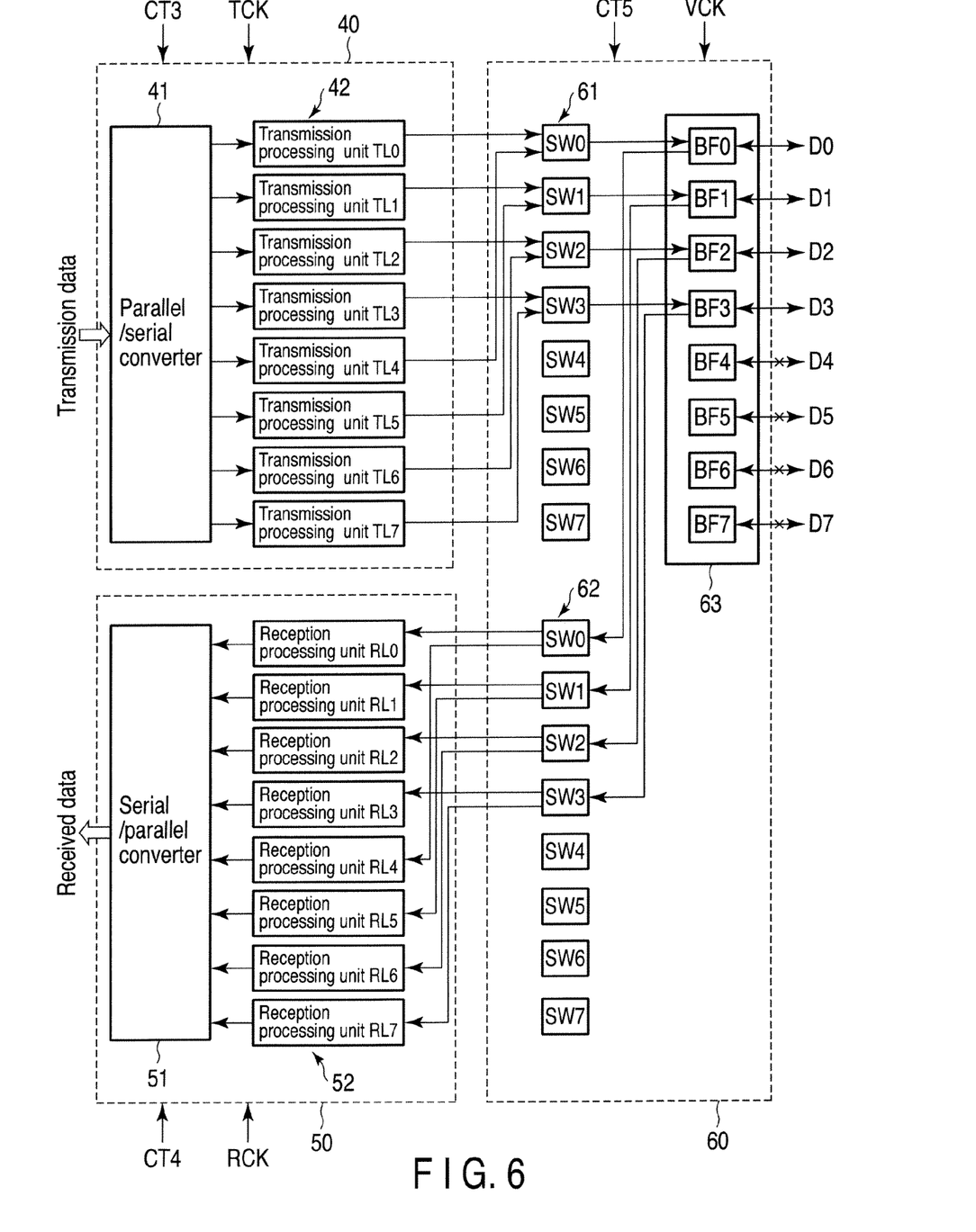
FIG. 6 represents an example of a 4-bit DDR mode interface constructed by switching operation of the interface unit represented in FIG. 3.

FIG. 6 represents an example of a 4-bit DDR mode interface which is constructed by switching operation of the interface unit 60. If setting information registered in the setting register 30 in FIG. 2 expresses the 4-bit DDR mode, the clock generator 10 outputs the card clock CDCK, transmission clock TCK, and reception clock RCK at equal frequency, and outputs the transfer clock VCK at twice the frequency of the card clock CDCK.

In synchronization with a rise of the transfer clock VCK, switches SW0 to SW3 of the switching circuit 61 alternately select a group of data lines for four odd bits, which are connected to transmission processing units TL0 to TL3 of the transmission circuit 40, and a group of data lines for four even bits, which are connected to transmission processing units TL4 to TL7. Transmission data obtained from these groups of data lines is supplied to input/output buffers BF0 to BF3. In this manner, input/output buffers BF0 to BF3 transfer the transmission data to the memory card through input/output terminals D0 to D3. Since the frequency of the transfer clock VCK is twice the frequency of the card clock CDCK, the memory card obtains four-odd-bit data and four-even-bit data respectively at a rise and a fall of the card clock CDCK.

On the other side, received data is supplied from the memory card to the switching circuit 62 through bit input/output terminals D0 to D3 and input/output buffers BF0 to BF3. Specifically, the input/output buffers BF0 to BF3 are supplied odd-bit data and even-bit data respectively in synchronization with a rise and a fall of the card clock CDCK. The frequency of the transfer clock VCK is twice the frequency of the card clock CDCK. Thus, the input/output buffers BF0 to BF3 take in odd-bit data and even-bit data at a rise of the—transfer clock VCK.

In synchronization with a rise of the transfer clock VCK, switches SW0 to SW3 of the switching circuit 62 alternately select a group of data lines for four odd bits, which are connected to reception processing units RL0 to RL3 of the reception circuit 50, and a group of data lines for four even bits, which are connected to reception processing units RL4 to RL7. As a result of this, odd-byte-data to reception processing units RL0 to RL3 and even-byte-data to reception processing units RL4 to RL7 are alternately output.

In the reception circuit 50, four-odd-bit data decoded by reception processing units RL0 to RL3 and four-even-bit data decoded by reception processing units RL4 to RL7 are subjected to serial/parallel conversion by the serial/parallel converter 51, and are output in units of byte or in units of plural bytes to the data processing circuit.

In the computer terminal according to the present embodiment, setting information concerning an input/output method of a memory card is held by the setting register circuit 30, and at least frequency of the transfer clock VCK generated by the variable frequency clock generator 10 is controlled based on the setting information. In this case, compatibility is available with various data rates which vary depending on differences among input/output methods of memory cards, and most of hardware resources can be used in common without causing troubles from differences among input/output methods. Accordingly, enhancement of installation space and power consumption can be suppressed.

The present invention is not limited to the above embodiment but can be variously modified without deviating from the subject matter of the invention.

In the above embodiment, the clock generator 10 generates the card clock CDCK, the transfer clock VCK having a variable frequency, the transmission clock TCK, and the reception clock RCK. Alternatively, however, there may be provided a first clock generation module which generates a fixed clock having common frequency as the card clock CDCK, transmission clock TCK, and reception clock RCK, and a second clock generation module capable of varying the frequency of the fixed clock by multiplying the frequency by a natural number. In this case, the fixed clock is supplied from the first clock generation module to the card clock output circuit 20, transmission circuit 40, and reception circuit 50, and a varied clock is supplied from the second clock generation module to the interface unit 60.

The host controller HC has been described as an example compatible with the 4-bit SDR method, 8-bit SDR method, and 4-bit DDR method, as typical input/output methods for memory cards. However, the host controller HC may further be modified to be compatible with DDR2 by setting quadruple as magnification of the transfer clock VCK relative to the card clock CDCK.

Various modules described herein, such as a computer terminal, etc., can be constituted by one or more components such as a software application, hardware, and/or a software module. Such various modules may be written separately, on one side, and may be distributed to all or part of basing logics and/or codes, on the other side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A host controller comprising:
a card slot into which a memory card is inserted;
a transmission circuit that encodes transmission data, according to a serial transfer format;
a reception circuit that decodes received data, according to the serial transfer format;
a variable frequency clock generator that generates a transfer clock, and a card clock having a frequency equal to or lower than that of the transfer clock;
a card clock output unit that outputs the card clock to the memory card;
an interface unit comprising a transmission interface that transfers the transmission data from the transmission circuit to the memory card in synchronization with the transfer clock, and a reception interface that transfers received data from the memory card to the reception circuit in synchronization with the transfer clock; and
a setting register circuit that holds setting information concerning an input/output method of the memory card, and controls frequencies of the transfer clock and the card clock generated by the variable frequency clock generator, based on the setting information,
wherein
the transmission interface comprises a first switch circuit including a plurality of selection units, each of the selection units sequentially selecting and outputting, in response to the transfer clock, first and second transmission data items from the transmission circuit;
the reception interface comprises a second switch circuit including a plurality of selection units, each of the selection units of the reception interface sequentially selecting and outputting, in response to the transfer clock, first and second received data items from the memory card; and
the transmission circuit encodes the transmission data in response to the card clock, and the reception circuit decodes the received data in response to the card clock.

2. The host controller of claim 1, wherein under the control of the variable frequency clock generator, the setting register circuit varies magnification of the frequency of the transfer clock relative to frequency of the card clock, depending on the input/output method of the memory card.

3. The host controller of claim 2, wherein
the setting register circuit sets a frequency of the transfer clock to a value twice the frequency of the card clock;
number of outputs of the transmission circuit is twice number of the selection units of the first switch circuit; and
number of outputs of the reception circuit is twice number of the selection units of the second switch circuit.

4. The host controller of claim 3, wherein
the transmission circuit comprises:
a parallel/serial converter that subjects the transmission data to parallel/serial conversion, and
a plurality of transmission processing units each of which encodes serial data constituted sequentially in units of bit positions by the parallel/serial converter, thereby to convert the serial data into serial packets, and outputs the serial packets to the at least one line of the group of transmission data lines selected by the switching circuit, and
the reception circuit comprises
a plurality of reception processing units that decode the received data input as the serial packets respectively from the at least one line of the group of reception data lines selected by the switching circuit, and
a serial/parallel converter that subjects, to serial/parallel conversion, the received data output in units of bit positions from the plurality of reception processing units.

5. The host controller of claim 1, wherein the input/output method of the memory card is selected at least from among a single data rate (SDR) method and a double data rate (DDR) method.

6. A host controller comprising:
a card slot into which a memory card is inserted;
a transmission circuit that encodes transmission data, according to a serial transfer format;
a reception circuit that decodes received data, according to the serial transfer format;

a variable frequency clock generator that generates a transfer clock, and a card clock;

an interface unit comprising a transmission interface that transfers the transmission data from the transmission circuit to the memory card serially in synchronization with the transfer clock, and a reception interface that transfers received data from the memory card to the reception circuit serially in synchronization with the transfer clock; and a setting register circuit that holds setting information concerning an input/output method of the memory card, and controls frequencies of the transfer clock and the card clock generated by the variable frequency clock generator, based on the setting information, wherein the transmission circuit encodes the transmission data in response to the card clock, and the reception circuit decodes the received data in response to the card clock.

7. The host controller of claim 6 further comprising:
a card clock output unit that outputs the card clock to the memory card, wherein the card clock output unit is controlled by the setting register circuit.

8. The host controller of claim 6, wherein under the control of the variable frequency clock generator, the setting register circuit varies magnification of the frequency of the transfer clock relative to frequency of the card clock, depending on the input/output method of the memory card.

9. The host controller of claim 8, wherein
the setting register circuit sets a frequency of the transfer clock to a value twice the frequency of the card clock;
number of outputs of the transmission circuit is twice number of the selection units of the first switch circuit; and
number of outputs of the reception circuit is twice number of the selection units of the second switch circuit.

10. The host controller of claim 9, wherein the transmission circuit comprises:
a parallel/serial converter that subjects the transmission data to parallel/serial conversion, and
a plurality of transmission processing units each of which encodes serial data constituted sequentially in units of bit positions by the parallel/serial converter, thereby to convert the serial data into serial packets, and outputs the serial packets to the at least one line of the group of transmission data lines selected by the switching circuit.

11. The host controller of claim 10, wherein the reception circuit comprises
a plurality of reception processing units that decode the received data input as the serial packets respectively from the at least one line of the group of reception data lines selected by the switching circuit, and
a serial/parallel converter that subjects, to serial/parallel conversion, the received data output in units of bit positions from the plurality of reception processing units.

12. A host controller comprising:
a transmission circuit that encodes transmission data, according to a serial transfer format;
a reception circuit that decodes received data, according to the serial transfer format;
a variable frequency clock generator that generates a transfer clock, and a card clock;
an interface unit comprising a transmission interface that transfers the transmission data from the transmission circuit serially in synchronization with the transfer clock, and a reception interface that transfers received data to the reception circuit serially in synchronization with the transfer clock; and a setting register circuit that holds setting information concerning an input/output method of the transmission data and the received data, and controls frequencies of the transfer clock and the card clock generated by the variable frequency clock generator, based on the setting information,
wherein the transmission circuit encodes the transmission data in response to the card clock, and the reception circuit decodes the received data in response to the card clock.

13. The host controller of claim 12, wherein the transmission interface comprises a switch circuit including a plurality of selection units, each of the selection units sequentially selecting and outputting, in response to the transfer clock, first and second transmission data items from the transmission circuit.

14. The host controller of claim 12, wherein the reception interface comprises a switch circuit including a plurality of selection units, each of the selection units of the reception interface sequentially selecting and outputting, in response to the transfer clock, first and second received data items.

15. The host controller of claim 12, wherein the card clock has a frequency equal to or lower than that of the transfer clock.

16. The host controller of claim 12, wherein the transmission and received data items are transmitted and received from a memory card.

17. The host controller of claim 16, wherein under the control of the variable frequency clock generator, the setting register circuit varies magnification of the frequency of the transfer clock relative to frequency of the card clock, depending on the input/output method of the memory card.

18. The host controller of claim 17, wherein
the setting register circuit sets a frequency of the transfer clock to a value twice the frequency of the card clock;
number of outputs of the transmission circuit is twice number of the selection units of the first switch circuit; and
number of outputs of the reception circuit is twice number of the selection units of the second switch circuit.

19. The host controller of claim 18, wherein
the transmission circuit comprises:
a parallel/serial converter that subjects the transmission data to parallel/serial conversion, and
a plurality of transmission processing units each of which encodes serial data constituted sequentially in units of bit positions by the parallel/serial converter, thereby to convert the serial data into serial packets, and outputs the serial packets to the at least one line of the group of transmission data lines selected by the switching circuit, and
the reception circuit comprises
a plurality of reception processing units that decode the received data input as the serial packets respectively from the at least one line of the group of reception data lines selected by the switching circuit, and
a serial/parallel converter that subjects, to serial/parallel conversion, the received data output in units of bit positions from the plurality of reception processing units.

20. The host controller of claim 12, wherein the input/output method of the memory card is selected at least from among a single data rate (SDR) method and a double data rate (DDR) method.

* * * * *